United States Patent [19]

Spurrier et al.

[11] Patent Number: 5,374,026
[45] Date of Patent: Dec. 20, 1994

[54] OUTLET FITTING

[75] Inventors: Hal M. Spurrier; Jeffrey T. Rogers; William K. Rogers, all of Lincoln, Nebr.

[73] Assignee: Snyder Industries, Inc., Lincoln, Nebr.

[21] Appl. No.: 62,139

[22] Filed: May 17, 1993

[51] Int. Cl.⁵ .................. B29C 33/12; B29C 41/20
[52] U.S. Cl. ........................ 249/61; 249/91; 249/93; 249/111; 425/117
[58] Field of Search .......... 425/117, 124, 435; 249/91, 93, 94, 111, 61

[56] References Cited

U.S. PATENT DOCUMENTS

| 1,800,082 | 4/1931 | Knigge | 220/466 |
|---|---|---|---|
| 2,830,325 | 4/1958 | Bray | 249/111 |
| 2,985,916 | 5/1961 | Reuter et al. | 249/61 |
| 3,177,014 | 4/1965 | Bergstrom | 285/206 |
| 3,192,568 | 7/1965 | Nicholls | 249/111 |
| 3,247,999 | 4/1966 | Stilwell | 220/461 |
| 3,339,609 | 9/1967 | Cushman | 249/93 |
| 3,432,069 | 3/1969 | Craig | 220/288 |
| 3,912,218 | 10/1975 | Lister | 249/93 |
| 3,918,605 | 11/1975 | Butler | 220/404 |
| 4,179,038 | 12/1979 | Rosan, Jr. | 220/243 |
| 4,775,073 | 10/1988 | Webb | 220/256 |

Primary Examiner—James P. Mackey
Attorney, Agent, or Firm—Hovey, Williams, Timmons & Collins

[57] ABSTRACT

A container is provided with an outlet opening and an annular insert embedded in the container at the opening. The insert surrounds the opening and includes an inner circumferential surface that is exposed within the opening. The synthetic resin material of the body surrounds the insert except for the inner circumferential surface so that the insert is substantially embedded in the body at the opening. The inner circumferential surface of the insert is threaded to receive an outlet coupling, and seats are defined between the insert and the interior and exterior of the container. A mold is also provided for forming a container within which an insert is embedded. The mold includes an insert assembly having a support and a heat sink which are able to shear free from one another during cooling of the container within the mold.

5 Claims, 4 Drawing Sheets

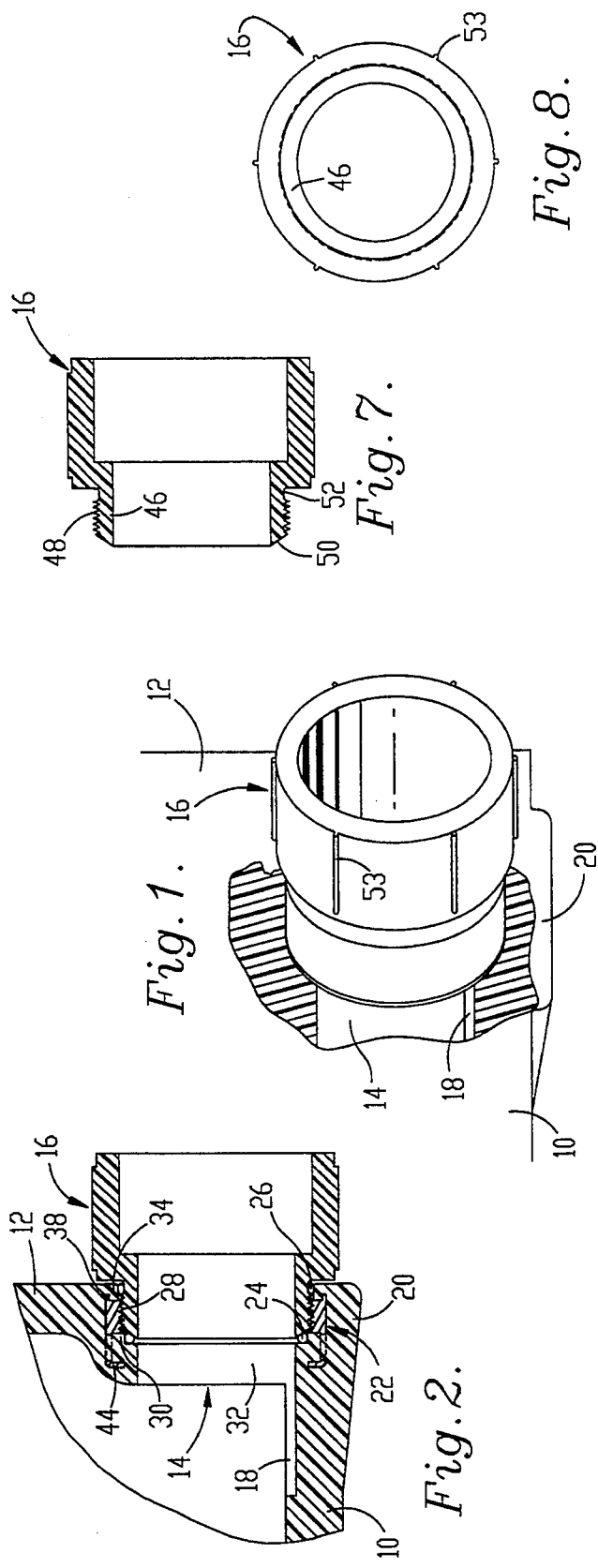

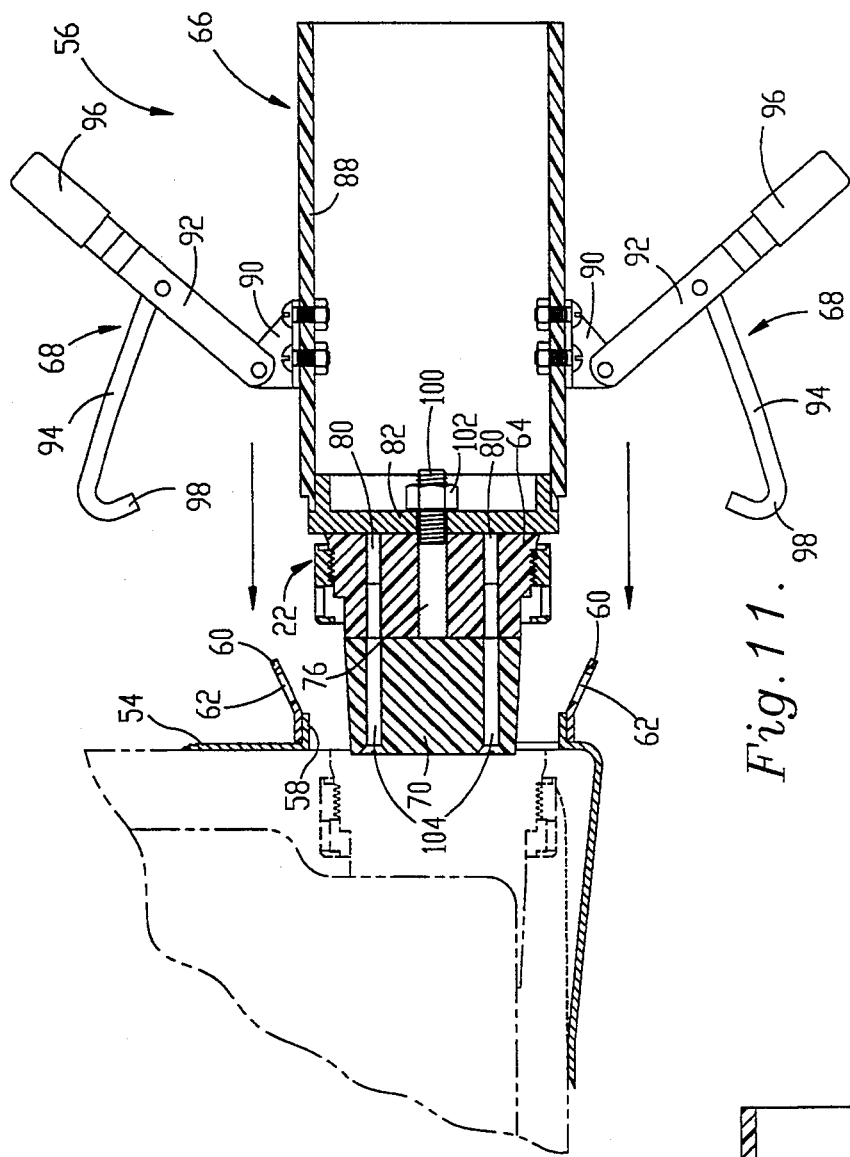
Fig. 11.
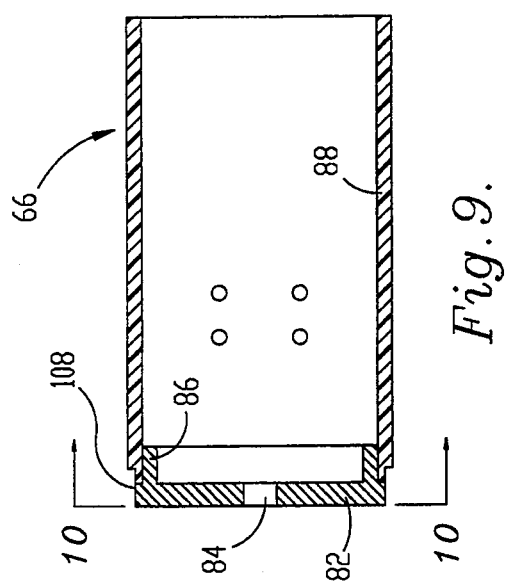
Fig. 10.
Fig. 9.

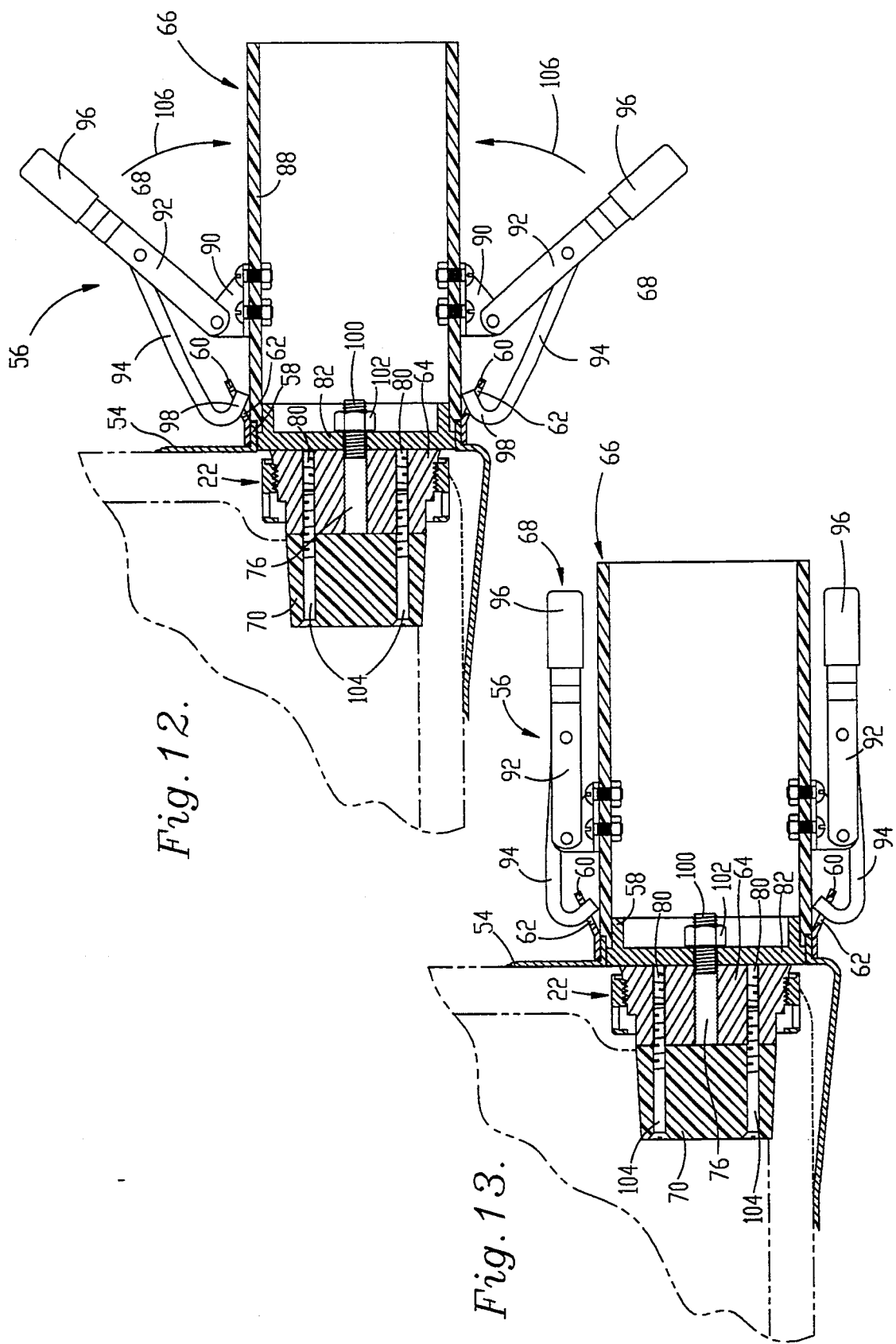

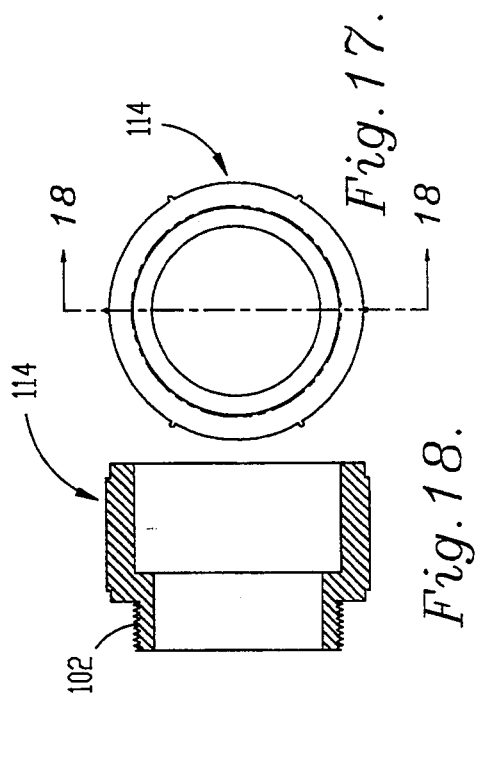
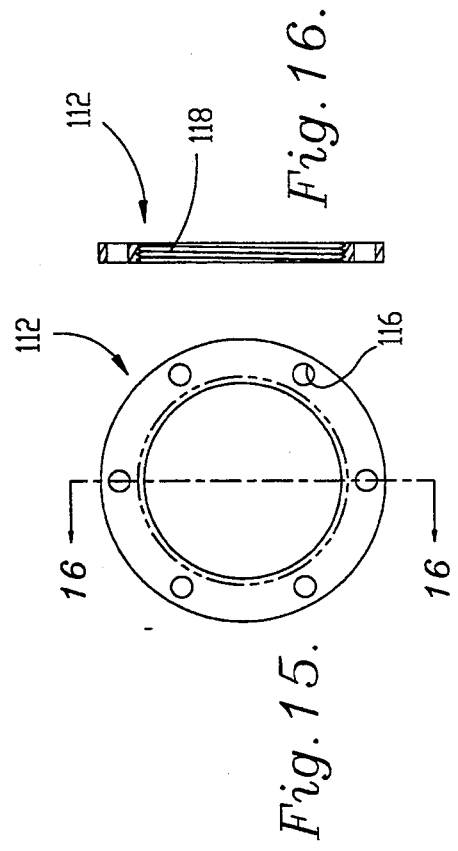
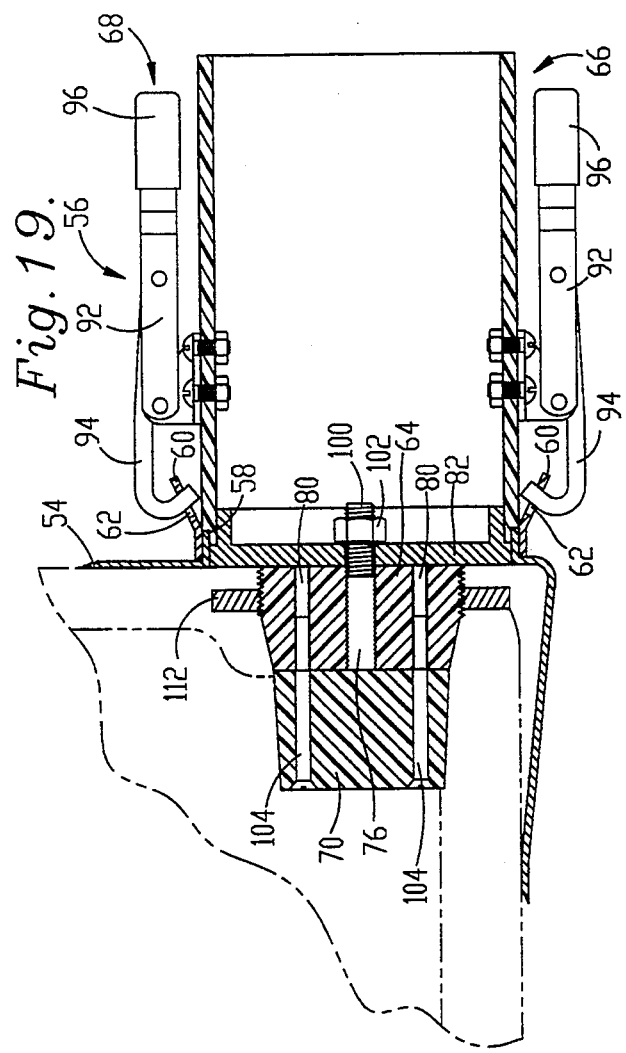
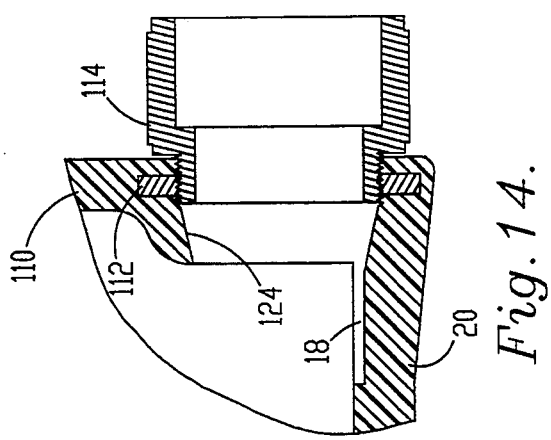

OUTLET FITTING

BACKGROUND OF THE INVENTION

1. Field of the Invention

The present invention relates generally to liquid containers and, more particularly, to a container provided with an outlet opening within which a threaded insert is exposed to enable receipt of an outlet coupling. The invention also relates to a mold for forming a container within which an insert is embedded.

2. Discussion of the Prior Art

It is known to form a container out of polyolefin or other suitable synthetic resin material, for use in storing agricultural and industrial chemicals. These containers are commonly formed by any of a number of different molding processes, such as rotation molding or the like.

Where it is desired to provide a means for transferring liquids into and out of the container, an outlet fitting is typically provided in the side wall of the container adjacent the bottom wall. By providing this construction, the container may be drained almost completely by grounding so that very little liquid is wasted as residue within the container.

The outlet fitting conventionally consists of an outlet opening cut into the side wall of the container or sump area subsequent to the molding operation, and a sandwich-type fitting, assembled at the cut opening, for receiving a universal coupler to which additional plumbing hardware may be attached.

Containers constructed in accordance with conventional practice experience numerous drawbacks. For example, because the outlet opening is cut after the molding process, the material surrounding the opening contains no additional reinforcement to support the increased loads typically exerted at the opening by plumbing hardware. In addition, by cutting a hole and removing material from the container, the strength of the container is adversely effected, and the area surrounding the opening is susceptible to cold-flowing away from the coupler such that the chance for leakage is increased.

OBJECTS AND SUMMARY OF THE INVENTION

It is an object of the present invention to provide a container having an outlet fitting with a metallic insert that retains its shape and prevents the container material from cold-flowing away from around the opening.

It is another object of the present invention to provide a mold which properly positions an insert during the formation of a container within which the insert is to be embedded, and that achieves a build-up of material around a molded outlet opening to improve the strength of the container at the opening.

In accordance with these and other objects evident from the following description of a preferred embodiment of the invention, a liquid container apparatus comprises a synthetic resin body presenting bottom and side walls, and defining an outlet opening extending through one of the walls between the interior of the container and the exterior thereof. An annular insert is embedded in the body at the opening, the insert surrounding the opening and including a threaded inner circumferential surface that is exposed within the opening. The synthetic resin material surrounds the insert except for the inner circumferential surface so that the insert is substantially embedded in the body at the opening and divides the opening into inner and outer portions. Seats are provided between the insert and the interior and exterior of the container body to seal off the insert from exposure to chemicals either from within or from outside the container.

By providing a container constructed in accordance with the present invention, numerous advantages are achieved. For example, by providing an insert within the body at the opening, the opening is strengthened to resist deformation of the threads within the opening, and cold-flowing of the synthetic resin material away from the opening is restrained. In addition, by sealing the insert from exposure to both the interior and exterior of the container, it is possible to protect the insert against chemical erosion, increasing the useful life of the container.

In accordance with another aspect of the invention, a mold is provided for forming a container within which an insert is embedded, and for supporting the formed container during a cooling operation subsequent to formation. The mold comprises a mold body presenting a circumferential wall, and defining a hole extending through the wall between the interior and exterior of the body. An insert support assembly supports the insert within the mold during formation of the container. The insert support assembly includes a cylindrical support having a flat end wall and a threaded outer circumferential surface adapted to support the insert, and a heat sink having an end surface in contact with the end wall of the support and a side wall protruding from the end wall away from the support. A clamping means is provided for clamping the support assembly within the hole with the end surface of the heat sink flush with the mold body so that only the support and insert extend into the interior of the body. A linking means between the support and heat sink links the support and heat sink together. The linking means is constructed of a strength capable of withstanding a shear force of a value greater than the value of the force exerted on the assembly during formation of the container and less than the value of the force exerted on the assembly by the weight of the container during the cooling operation such that the support, insert and container are able to shear free from the heat sink and mold body during the cooling operation.

By this construction, a mold is provided which achieves a build-up of container material around the outlet opening during formation so that the finished container is stronger around the opening in order to support the increased loads exerted by external plumping fixtures. In addition, the mold allows the container to contract within the mold during cooling without presenting any protrusions within the mold that could damage the container before it is withdrawn from the mold.

BRIEF DESCRIPTION OF THE DRAWING FIGURES

A preferred embodiment of the present invention is described in detail below with reference to the attached drawing figures, wherein:

FIG. 1 is a fragmentary perspective view of a container constructed in accordance with the present invention, illustrating an outlet fitting formed in the container;

FIG. 2 is a fragmentary side sectional view of the container at the outlet fitting;

FIG. 3 is a sectional view of a support which forms a part of a mold used to form a container in accordance with the present invention;

FIG. 4 is an end elevational view of the support;

FIG. 5 is a sectional view of an insert embedded within the container during formation;

FIG. 6 is an end elevational view of the insert;

FIG. 7 is a sectional view of a coupling that is attached to the container within the outlet opening;

FIG. 8 is an end elevational view of the coupling;

FIG. 9 is a sectional view of a heat sink used with the mold;

FIG. 10 is an end elevational view of the heat sink, taken along line 10—10 of FIG. 9;

FIG. 11 is a sectional view of the mold, support assembly and insert prior to assembly of the mold;

FIG. 12 is a sectional view similar to FIG. 11, illustrating assembly of the mold;

FIG. 13 is a sectional view similar to FIG. 11, illustrating the assembled mold;

FIG. 14 is a fragmentary sectional view of the container, illustrating a modified construction of the outlet fitting;

FIG. 15 is an end elevational view of a modified insert;

FIG. 16 is a sectional view of the modified insert taken along line 16—16 of FIG. 15;

FIG. 17 is an end elevational view of a modified coupler;

FIG. 18 is a sectional view of the modified coupler taken along line 18—18 of FIG. 17; and FIG. 19 is a sectional view of an assembled modified mold.

DETAILED DESCRIPTION OF THE PREFERRED EMBODIMENT

A container constructed in accordance with a preferred embodiment of the present invention is illustrated in FIG. 1, and includes a synthetic resin body presenting bottom and side walls 10, 12, and defining an outlet opening 14 extending through the side wall between the interior of the container and the exterior thereof. An outlet fitting including a PVC coupler 16 is provided in the outlet opening for permitting attachment of the opening to conventional plumbing hardware.

The container is of a hollow cylindrical shape, and the tubular side wall 12 extends between the planer, circular bottom wall 10 and a domed circular top wall, not shown. The container is preferably formed of polyolefin by a rotation molding technique, and has a wall thickness ranging between less than 0.5 inches to greater than 1.5 inches, and preferably between 0.75 inches and 1.25 inches.

The side wall 12 may be formed of any desired height so that a large range of container sizes are available. The side wall is connected to the bottom wall around the circumferential edge of the bottom wall, and the corner between the side and bottom walls is radiused, except at the outlet opening where a sump 18 is provided to enable complete emptying of the container.

A foot 20 is formed in the bottom wall of the container directly beneath the outlet opening 14. When the container is arranged on a support surface, the foot 20 creates a moment force at the corner between the bottom and side walls adjacent the outlet opening such that the side wall is biased inward and prevents the side wall from bowing outward under the weight of the container and the liquid therein.

In addition, the thickness of the wall is greater at the opening than elsewhere along the side wall in order to provide additional strength at the opening for withstanding mechanical loads exerted on the container at the opening by external plumbing fixtures and the like attached to the coupler.

The outlet fitting is illustrated in more detail in FIG. 2, and includes the opening 14, an annular metal insert 22 embedded in the body at the opening, the coupler 16, and a pair of resilient O-rings 24, 26.

The opening 14 extends completely through the side wall at the very bottom of the side wall adjacent the bottom wall and is positioned at the bottom of the sump 18 so that water draining into the sump is free to drain completely from the container. However, it is possible to construct the container with the outlet opening and fitting provided at any desired location in the container.

The opening is divided into inner and outer longitudinal portions 32, 34 by the insert 22, which includes an inner circumferential surface 28 that is exposed within the opening. The inner portion 32 of the opening includes a cylindrical surface having an enlarged stepped region 30 adjacent the insert and sized for receipt of the resilient O-ring 24. The outer longitudinal portion 34 of the opening is also cylindrical, having a diameter slightly greater than the diameter of the stepped region 30, and defining a seat for the other O-ring.

The insert 22 is illustrated in FIG. 6, and includes an annular ring formed of stainless steel or any other suitable material capable of being molded into the container during formation and strong enough to withstand the loads experienced during use of the container and repeated replacement of the coupler. As shown in FIG. 5, the insert includes the inner circumferential surface 28 that is threaded to receive the coupler 16, and an outer cylindrical surface 36.

The insert is formed with an outer annular flange 38 which extends in a first longitudinal direction and an inner annular flange 40 extending in the opposite longitudinal direction. When the insert is molded into the container the outer flange 38 extends toward the exterior of the body and overlies a fraction of the outer portion 34 of the opening, while the inner flange 40 extends toward the interior of the body, overlying a fraction of the inner portion 32 of the opening.

A plurality of holes 42 are formed in the inner flange and extend through the insert in a radial direction. In addition, the inner flange is also provided with a radially inward directed lip 44 which extends inward by a distance less than the radial thickness of the insert.

As shown in FIG. 7, the coupler 16 is a PVC fitting having a standard universal internal solvent-weld attachment for use with other conventional plumbing hardware. The coupler is tubular in shape, having a small diameter portion 46 provided with a threaded outer circumferential surface 48 sized for threaded engagement with the threaded inner circumferential surface 28 of the insert.

The distal end of the small diameter portion 46 is tapered to define a seat 50 for the O-ring 24, and the threads on the outer circumferential surface 48 of the small diameter portion are removed within a small length of the surface 48 to define a seat 52 for the other O-ring 26. As illustrated in FIG. 8, longitudinal ridges 53 are provided on the large-diameter region of the coupler to permit handling of the coupler during assembly.

As illustrated in FIG. 2, the O-rings 24, 26 are formed of any desired resilient, compressible material capable of providing a liquid-tight seal when compressed by about 30% of their original size. The O-ring 24 is retained by the seat 50 at the tapered distal end of the coupler, and by the enlarged stepped region 30 of the inner portion of the outlet opening. Thus, a seal is provided between the insert and the interior of the container so that the insert is protected from fluid communication with the chemicals within the container. The other O-ring 26 is retained within the space between the seat 52 and the outer portion 34 of the outlet opening, and is held longitudinally in position between the threads and the large diameter portion of the coupler 16.

Numerous advantages are achieved by providing this construction. For example, by providing a fitting within which two separate seals are provided, one interior of and another exterior of a metal insert, it is possible to employ an insert which provides the strength and durability of a metal connection, while sealing the insert from exposure to potentially harmful chemicals that might normally cause corrosion and failure of the metal if allowed to contact the metal.

In addition, the outer flange 38 of the insert 22 provides support to the thermoplastic resin of the container in the region of the outer portion 34 of the outlet opening such that the thermoplastic resin is impeded from cold flowing away from the opening during mechanical loading of the material. The inner flange 40, as well as the radially inward extending lip 44, serve a similar function by preventing the thermoplastic resin surrounding the inner portion 32 of the outlet opening from cold flowing either radially or diagonally away from the opening. The radial holes 42 in the insert allow the thermoplastic resin to substantially embed the insert within the thermoplastic resin during formation so that it is reliably held in place during use.

A mold for forming a container of the foregoing construction is illustrated in FIG. 11, and includes a mold body 54 presenting an outer circumferential wall and defining a hole extending through the wall between the interior and exterior of the body. The mold also includes an insert support assembly 56 for supporting the insert 22 within the mold during formation of the container.

The mold body 54 is preferably formed of steel or any other suitable material capable of supporting the thermoplastic resin therein during formation of a container and of withstanding the elevated temperatures normally encountered in a conventional rotation molding process, which range from 500° F. to more than 600° F. An external protruding lip 58 is provided on the body at the opening, and a pair of diametrically opposed ears 60 are welded or otherwise affixed to the lip. Each of the ears is provided with a hole 62.

The insert support assembly 56 broadly includes a support 64, a heat sink 66, a pair of clamp assemblies 68, a sump-forming block 70 connected to the support, and a linking means 100, 102 between the support and heat sink for linking the support and heat sink together.

The support 64 is illustrated in FIGS. 3 and 4, and is of generally cylindrical shape, including an outer circumferential surface divided into a small-diameter section 72 and a large-diameter section 74. The large-diameter section is threaded along an intermediate portion thereof, and is tapered radially outward at an end of the support opposite the small-diameter end 72.

As shown in FIG. 4, the support includes a central threaded opening 76 extending longitudinally through the support for receiving the linking means 100, and the large diameter end of the support is provided with a pair of diametrically opposed cavities 78 adapted to receive a tool for removing the support upon completion of molding. Four smaller threaded holes 80 extend longitudinally through the support for permitting attachment of the sump-forming block 70.

The support 64 is formed of aluminum, which possesses a higher thermal expansion ratio than that of the stainless steel used in the insert 22 so that the insert may be manually threaded onto the outer circumferential surface 74 of the support during assembly while the support expands relative to the insert during formation of the container to retain the insert on the assembly.

Thus, the insert 22 and support 64 are constructed to provide sufficient clearance between the parts to enable manual assembly of the insert on the support. However, because of the difference in thermal expansion ratios between the two materials, the aluminum expands into the insert to provide a zero-clearance fit between the parts when the mold is subjected to the elevated temperatures, e.g. 500°-600° F., of a molding process. Other materials may be used in forming both the insert and the support. However, the materials should possess different thermal expansion ratios, with the ratio of the support material being higher than the ratio for the insert material, in order to provide this benefit of the present invention.

The heat sink 66 is shown in FIGS. 9 and 10, and includes a circular plate 82 formed of any suitable heat conductive material such as stainless steel, and includes a central aperture 84 through which the linking means extends. An axially extending tubular flange 86 is provided on one face of the circular plate, and a tubular sleeve 88 formed of heat conductive material is received on the flange so that heat may be transferred through the flange between the plate and sleeve.

Returning to FIG. 11, the clamp assemblies 68 are secured to opposite sides of the sleeve 88 for connecting the insert support assembly 56 to the mold body 54. Each clamp assembly includes a base 90 secured to the sleeve by bolts, a lever 92 pivotally attached to the base, and a hook 94 pivotally attached to the lever. Each lever is provided with a handle 96 by which the assembly is operated, and each hook includes a curled distal end 98 sized for receipt within the hole 62 of one of the ears 60.

The linking means preferably includes a stud 100 formed of polytetrafluorethylene, a commercial embodiment of which is marketed under the trademark TEFLON. The stud is threaded into the central opening 76 of the support 64, and extends through the central aperture 84 in the circular plate 82 of the heat sink 66. A nut 102 is threaded onto the stud 100 to retain the heat sink in pressing contact with the large diameter end of the support so that heat may be transferred between the support 64 and the heat sink 66.

The stud 100 is constructed of a size and strength capable of withstanding a tensile or shear force of a value greater than the value of the force exerted on the assembly 56 during formation of the container and less than the value of the force exerted on the assembly by the weight of the container during the cooling operation such that the support 64, insert 22 and container are able to shear free from the heat sink 66 and mold body 54 during the cooling operation.

For example, in a mold designed for use in constructing a container having a capacity of between 3,000–22,000 gallons of liquid, a wall thickness of between 0.75 and 1.25 inches, and an outlet fitting 3 inches in diameter, the stud is selected of a size and strength sufficient to withstand a tensile or shear force of about 200 lbf. However, this value varies based upon the size of the mold, the estimated weight of the container being formed therein, the thickness of the container walls, and the size of the outlet fitting so that the stud will shear only after the container has formed and begins to shrink during cooling of the mold. Thus, experimentation is necessary to determine the holding force of the stud for any particular construction.

It is preferred that the material used in the stud possess the desired physical characteristics to permit a stud of a given diameter to provide the desired tensile and shear strength so that the stud fractures at the point when the container begins to pull away from and shear the stud during cooling. However, if it is not possible to find a material that provides the desired strength in the diameter available, it is possible to adjust the strength of the stud by partially stripping the threads of the stud or by cutting a portion of the stud away.

The sump-forming block 70 is preferably formed of polytetrafluorethylene or any other suitable material having a nonstick surface, and includes a plurality of holes through which the block is connected to the support by screws 104. The block 70 is of generally cylindrical shape having a slightly tapered outer circumferential surface. The large-diameter end of the block is held in pressing contact with the small-diameter end of the support 64 so that, during molding, material is prevented from getting between the block and support. The sump-forming block, along with the small-diameter portion of the support, forms the sump 18 in the container during the molding process.

As shown in FIG. 11, The mold is assembled by first manually threading the insert 22 onto the support, and attaching the support to the sump-forming block with screws 104, and to the heat sink with the stud 100 and nut 102. Thereafter, the support assembly 56 is inserted into the hole of the mold body 54, sump-forming block first, so that the insert is supported within the mold.

Turning to FIG. 12, once the support assembly is positioned within the hole of the mold, the hook 94 of each clamp assembly 68 is inserted in the hole 62 of one of the ears 60, and the levers 92 are moved in the direction of the arrows 106 to a locked position, as shown in FIG. 13. When the support assembly is positioned within the hole of the mold, the lip 58 supports the heat sink 66 and positions the support assembly so that the insert and support are in the desired orientation relative to the container to be formed. Preferably, as shown in FIG. 9, a ridge 108 is provided on the sleeve of the heat sink, and this ridge seats against the lip of the mold to position the support assembly longitudinally within the hole.

By permitting assembly of the mold in this manner, numerous advantages are achieved. For example, because the insert is supported by the assembly, and the assembly is attached to the mold from outside the body, access to the interior of the mold is not required during assembly. This simplifies the process and permits the mold to be used for a variety of different applications where such access to the interior of the mold is not possible.

Once the support assembly is secured to the mold body, a molding process is carried out in a conventional manner, for example employing a rotation molding technique wherein the mold is charged with thermoplastic resin such as polyolefin, and is heated to a suitable temperature while being rotated. By this technique, the thermoplastic resin liquifies and is distributed across the inner surface of the circumferential wall of the mold, coating the wall and continuously building up the thickness of the coating. Thus, as the material cures, it forms the walls of the container.

At the outlet opening, defined during molding by the support and sump-forming block, heat is transferred during heating of the mold from the heat sink to the support and the insert. This added heat produces an extra-heavy layer of thermoplastic resin to collect around the opening so that the wall of the container is reinforced at the opening. In addition, a more uniform curing of the thermoplastic resin is achieved at the opening because of the improved heat transfer provided by the presence of the support and heat sink within the hole of the mold. Thus, porosity is reduced as are improper cure problems.

As the thermoplastic resin solidifies, it surrounds all of the exposed surfaces of the insert and the support so that the insert is completely embedded within the thermoplastic resin, except for the threaded inner circumferential surface 28 which is protected by the support from exposure to the thermoplastic resin.

Once the mold has been heated for a sufficient time, it is removed from exposure to the elevated temperature and is allowed to cool. During cooling, the thermoplastic resin of the container contracts so that the container is able to slide back and forth within the mold as the mold continues to rotate. It is at this stage of the process that the container exerts both a tensile force and a shear force on the stud 100 sufficient to either strip the threads of the stud 100, or to shear the stud in half, allowing the support 64, insert 22, sump-forming block 70, and a portion of the stud to fall away from the heat sink 66 and travel with the container. Because the circular plate 82 of the heat sink is flush with the interior surface of the mold wall, no protruding surfaces are presented that would scar the container or inhibit free movement of the container within the mold.

Once cooling of the container is complete, the container is removed from the mold, and the support and sump-forming block are unthreaded from the insert. As mentioned, a special tool may be provided which includes a centering pin adapted to fit within the central opening 76 of the support 64, and a pair of diametrically opposed driving pins adapted to fit within the cavities 78 to enable the tool to be rotated about the centering pin to loosen the support from the container. Once the support and block are removed, the coupler 16 and O-rings 24, 26 are installed to complete the outlet fitting.

Although the outlet fitting is illustrated as being located at the bottom of the side wall of the container, it is noted that it may be formed at any desired location simply by constructing the mold with the hole positioned accordingly. In addition, the outlet fitting is designed so that, when the coupler 16 is removed from the opening 14, nothing protrudes from the container which would inhibit handling or stacking of the container during delivery to an end-use site.

An alternate construction of the container is illustrated in FIGS. 14–18, and a modified construction of the support assembly is illustrated in FIG. 19. Turning first to FIG. 14, the container includes a synthetic resin body 110 and an annular insert 112 embedded in the body at the opening, and a coupler 114 is threaded into the outlet opening to provide a universal attachment for other conventional plumbing hardware.

The container body is substantially identical to the container described previously. However, the inner and outer portions of the outlet opening are each provided with threaded regions adjacent the insert so that the coupler engages the side wall of the container at both sides of the insert.

The insert 112 differs from the insert 22 of the prior embodiment. The insert 112 is illustrated in FIG. 15 as being ring shaped, and including a plurality of holes 116 extending through the insert in the longitudinal direction. As shown in FIG. 16, the inner circumferential surface 118 of the insert is threaded, and the insert is of a length sufficient to present at least 1.5 thread lengths.

The coupler 114 is illustrated in FIGS. 17 and 18, and is of generally tubular shape, similar to the coupler 16 discussed above. However, the coupler 114 is a standard, commercially available part, and is not modified structurally to define seats for O-rings within the outlet fitting. Rather, the coupler includes a small diameter portion 120 provided with a threaded outer circumferential surface of a length greater than the length of the threaded surface of the insert 112 so that when the coupler is threaded into the outlet opening, the threaded surface of the coupler engages both the insert and the threaded inner surface of the outlet opening to either side of the insert. In this manner, a plastic-to-plastic tapered threaded fit is provided between the coupler and the container on both sides of the insert 112.

The mold used to form a container accordance with this second preferred embodiment is shown in FIG. 19, and includes a construction substantially identical to the mold described previously, except that the shape of the support 122 is modified to accommodate the insert 112 and to form a threaded inner circumferential surface within the outlet opening on both sides of the insert. In addition, the small diameter end of the support is tapered to mate with the large diameter end of the sump-forming block 70.

By providing this construction of the outlet fitting, the annular insert 112 is embedded in the body at the opening, and presents the inner circumferential surface 118 that is exposed within the opening. The synthetic resin material of the body fills the holes 116 of the insert and surrounds it except for the inner circumferential surface so that the insert is substantially embedded in the body at the opening and divides the opening into the inner and outer portions. The support forms threads in the inner and outer portions of the opening adjacent the insert so that when the coupler is threaded into the opening, it engages the insert and both portions of the opening.

Preferably, the threaded inner circumferential surface 124 presented by the opening, and the threaded outer circumferential surface of the coupler 114 are standard tapered threads so that as the coupler is threaded into the opening a seal is formed between the threads of the coupler and the threads of the container.

All of the materials used in the modified construction are preferably identical to those used in the previously described embodiment, as is the process of forming the container.

Although the invention has been described with reference to the preferred embodiment illustrated in the attached drawing figures, it is noted that substitutions may be made and equivalents employed herein without departing from the scope of the invention as recited in the claims.

What is claimed is:

1. A mold for forming a container within which an insert is embedded, and for supporting the formed container during a cooling operation subsequent to formation, the mold comprising:
    a mold body presenting a circumferential wall, and defining a hole extending through the wall between the interior and exterior of the body; and
    an insert support assembly for supporting the insert within the mold during formation of the container, the insert support assembly including
        a cylindrical support having a flat end wall and a threaded outer circumferential surface adapted to support the insert,
        a heat sink having an end surface in contact with the end wall of the support and a side wall protruding from the end surface away from the support,
        a clamping means for clamping the support assembly within the hole with the end surface of the heat sink flush with the mold body so that only the support and insert extend into the interior of the body, and
        a linking means between the support and heat sink for linking the support and heat sink together, the linking means being constructed of a strength capable of withstanding a shear force of a value greater than the value of the force exerted on the assembly during formation of the container and less than the value of the force exerted on the assembly by the weight of the container during the cooling operation such that the support, insert and container are able to shear free from the heat sink and mold body during the cooling operation.

2. A mold as recited in claim 1, wherein the support is formed of a material having a thermal expansion ratio higher than the thermal expansion ratio of the insert so that the insert may be manually threaded onto the outer circumferential surface of the support during assembly while the support expands relative to the insert during formation of the container to retain the insert on the assembly.

3. A mold as recited in claim 2, wherein the support is formed of aluminum and the insert is formed of steel.

4. A mold as recited in claim 2, wherein the linking means includes a single shear link connecting the support to the heat sink, the link being formed of polytetrafluorethylene.

5. A mold as recited in claim 2, further comprising a sump-forming block and means for attaching the block to the support so that a sump is formed in a wall of the container adjacent the insert.

* * * * *